2,991,309
PROTEIN HYDROLYSIS
Forest A. Hoglan, Glenview, and Rudolph Kodras, Skokie, Ill., assignors to International Minerals & Chemicals Corporation, a corporation of New York
No Drawing. Filed Dec. 30, 1957, Ser. No. 705,825
9 Claims. (Cl. 260—529)

This invention relates to the hydrolysis of proteins. More particularly, it relates to an improved food-grade protein hydrolyzate and to a novel method for the production thereof.

It is well established that the human diet must include certain amino acids which are necessary for maintaining proper growth and health. These essential amino acids are ordinarily supplied in the required amounts by various types of proteins, which are a part of the everyday diet. In certain types of health disorders, however, the regular diet fails to supply the essential requirements. It then becomes desirable to supplement the diet with mixtures of essential amino acids either in pure form or in the form of hydrolyzed proteins.

The use of hydrolyzed protein is the most practical and economical means of such dietary supplementation. Preparations now on the market for this purpose are unsatisfactory, however, for such reasons as undesirable taste and odor, or excessive content of sodium or other objectionable constituents.

One object of the present invention is to provide a protein hydrolyzate for use as a dietary supplement.

Another object is to provide a protein hydrolyzate with improved taste properties, balanced quantities of essential amino acids, easy assimilability, low content of sodium, ammonia, and ash-forming constituents, and reduced cost.

Other objects will be apparent from the present description and claims.

In accordance with our invention, a proteinaceous material such as casein is commingled with aqueous sulfuric acid and heated until hydrolysis is substantially complete (i.e., until there is no further increase in amino nitrogen). The hydrolyzate is adjusted with lime to about pH 10–12.5, preferably between about pH 11.5 and 12, and an alkali-metal hydroxide is added in a quantity slightly in excess (up to about 10% in excess) of the quantity of glutamic and aspartic acids therein. The resulting precipitate of calcium sulfate is filtered off, preferably at an elevated temperature to minimize the solubility thereof. To the filtrate is added an aqueous solution of ammonium carbonate until a test for calcium ion in the liquid phase becomes negative. The resulting precipitate of calcium carbonate is filtered off. The filtrate is stripped substantially free of ammonia by evaporation, steam sparging, or the like, then adjusted to around pH 5 to 6 with hydrochloric acid, and decolorized by treatment with activated carbon at elevated temperature. The treated liquor may be concentrated and dried in suitable equipment at a temperature below about 85° C., preferably at reduced pressure. The resulting solid is a convenient form of the product of our invention.

The following illustrates a preferred embodiment of the invention.

Casein (100 lb.) and aqueous 50% sulfuric acid (200 lb.) are charged into a glass-lined reaction vessel equipped with a reflux condenser, agitator, jacket, and other accessories, and the mixture is heated and agitated at reflux temperature until hydrolysis is substantially complete, about 4 hours being sufficient for this purpose. Into the resulting hydrolyzate is admixed a 33% aqueous slurry of slaked lime until the pH reaches about 11.6. For this purpose, around 150 lb. of slaked lime is ordinarily sufficient when vigorous agitation is employed. To the resulting slurry is added 14 lb. of aqueous 50% sodium hydroxide solution, equivalent to the glutamic and aspartic acids therein. The slurry is then filtered, suitably on a continuous disk filter. The calcium sulfate cake is dropped into a repulping tank, where it is mixed with 540 lb. of fresh water. The repulp slurry is filtered, and the solids, comprising 233 lbs. of $CaSO_4$ and 108 lb. of water, are dropped into bins for removal to waste. The wash liquor from the repulping operation is returned to the lime tank, where it is used to make a lime slurry for the next batch.

Filtrate from the liming operation is pumped into another glass-lined, agitated vessel, where an aqueous 27% ammonium carbonate solution is added until precipitation ceases, 23 lb. of ammonium carbonate being required for this purpose. The resulting slurry of calcium carbonate is filtered. The solids are washed with 100 lb. of fresh water, and the carbonate cake (28 lb. $CaCO_3$ and 19 lb. water) is discarded. The washings are added to the filtrate.

The combined filtrate and washings are boiled in a glass-lined vessel at reduced pressure until substantially all ammonia has been removed, water being supplied as necessary to replace the water removed by the boiling. The pH of the liquid is then adjusted to about 5.5 with 37% hydrochloric acid (4.5 lb.). The solution is subjected to decolorization by a treatment in three steps with activated carbon, the quantities of carbon employed being successively 10 lb., 10 lb., and 5 lb. In each step, the solution is slurried with carbon, heated and agitated at about 60° C. for about 0.5 hour, and filtered. After the third treatment, the carbon cakes are combined, slurried with 250 lb. of fresh water, and filtered. The washed carbon cake (32 lb. of carbon and 50 lb. of water) is withdrawn and discarded or subjected to regeneration by well-known techniques.

The decolorized solution is pumped to a film-type evaporator, where it is concentrated under reduced pressure to around 40–50% solids at a temperature of 70–80° C. The concentrate is then sent to a vacuum drum dryer, where final drying and flaking are carried out at a temperature of 75–80° C. The dried flakes are removed from the drum dryer and transferred to air-tight containers under controlled conditions of temperature and humidity.

It will be apparent that numerous variations can be made in the conditions employed for the various steps described above. The hydrolysis of protein, for example, can be carried out at temperatures in the range of about 100 to about 125° C. or higher and over a wide range of concentrations, as the art discloses. The time required for complete hydrolysis varies to some extent, depending upon the temperature, concentration, and nature of the protein. Ordinarily, from about 2 to about 10 hours will be found sufficient, and specifically about 4 hours for casein with two parts by weight of aqueous 50% sulfuric acid at the reflux point.

In the liming operation, it is preferred to add a sufficient quantity of lime to reach the maximum pH attainable therewith, ordinarily in the range of about 11.5 to 12. This quantity of lime, when used in conjunction with sodium hydroxide in the defined quantities, is sufficient to reduce the sulfate content to around 0.2%. Filtration of the calcium sulfate is desirably carried out at about 60° C., where the solubility of the calcium sulfate is at a minimum.

Addition of sodium hydroxide, after liming, serves to promote the removal of calcium sulfate and subsequently to facilitate stripping out the free ammonia from the hydrolyzate. These are important matters in producing a final product of acceptable quality, since the presence of calcium, ammonia, and excess salts in the product leads to inferior taste properties.

The removal of ammonia is readily carried out simply by evaporation, preferably at elevated temperature, and preferably with addition of water to replace water removed with the ammonia. A convenient technique for removing the ammonia lies simply in heating the liquid to the boiling point and sparging the liquid at this temperature with steam.

After ammonia removal and prior to decolorization, we find it best to adjust the pH of the solution to around 5-6 with hydrochloric acid. This facilitates the decolorization and results in a product of superior taste properties.

It would, of course, be feasible to prepare the final product in the form of a solution or dispersion in water. It is most stable, however, if converted into a dry solid. For such conversion, we find it highly desirable to subject the solution to concentration and drying, suitably on a drum dryer, or in a spray dryer, the temperature being carefully regulated to 85° C. or lower during the drying operation.

The following operating examples will more clearly illustrate the invention:

EXAMPLE 1

A series of tests were carried out according to the following procedure, starting in each case with 200 grams of casein (86% protein) containing 24.4 grams of nitrogen.

In each test, 200 grams of casein were hydrolyzed by refluxing with 400 grams of 50% sulfuric acid for 4 hours. The resulting hydrolyzate was adjusted to about pH 11.7 by admixture with a slurry comprising 500 grams of lime and the calcium sulfate repulp water from a previous batch. To the mixture were added 28 grams of aqueous 50% sodium hydroxide. The total mixture was filtered. The calcium sulfate cake was repulped with 1100 grams of water, agitated, and filtered; and the repulp water was recycled to produce lime slurry in the next batch. The washed calcium sulfate cake, weighing about 1140 grams, was discarded.

To the primary filtrate were added approximately 65 grams of ammonium carbonate dissolved in 360 grams of water, this being sufficient to precipitate substantially all of the calcium in the form of the carbonate. The calcium carbonate slurry was filtered, and the calcium carbonate cake was washed with 200 grams of water. The wet cake, weighing 120 grams, was discarded.

The filtrate and washings were combined, diluted with 400 grams of water, and subjected to vacuum distillation to remove ammonia, 2 hours being required for this purpose. The ammonia-free solution was adjusted to pH 5.5 with 10 grams of 37% hydrochloric acid, then decolorized in three steps by use of 20, 20, and 10 grams of activated carbon in succession. In each carbon treatment, the mixture of carbon and solution was heated to 60° C., stirred for 0.5 hour, and filtered. Each of the carbon cakes was washed with 100 grams of water, and the washings were combined with the primary filtrate.

The decolorized solution was dried under vacuum at a temperature just below 85° C. The dried product ranged in weight from 160 to 180 grams.

The yield of dried product ranged up to 91%, based on the weight of casein. The nitrogen content of the dried product ranged up to 74% of input.

The normal ranges of product components are given in the following table:

*Product composition*

|  | Wt.-percent |
|---|---|
| Nitrogen: |  |
| Total | 11.8–12.2 |
| Amino | 7.2–7.6 |
| Ammonia | 1.5–2.5 |
| Moisture | 7.5–9.5 |
| Ash | 8.4–8.8 |
| Calcium | 0.03 |
| Sodium | 3.8 |
| Chloride | 5–6.5 |
| Sulfate | 0.2 |
| Carbonate | 0.02 |

The essential amino acid content of a typical product is given in the following table, where it is compared with the minimum daily requirements for man:

*Evaluation of product*

| Amino Acid | Casein Hydrolyzate, wt.-percent, dry | Casein,[1] wt.-percent, dry | MDR[2] | Ratio, Hydrolyzate: MDR |
|---|---|---|---|---|
| Tryptophan | 0.0 | 1.3 | 1.0 | [3] 1.0 |
| Phenylalanine | 1.4 | 3.6 | 4.4 | 1.4 |
| Valine | 5.4 | 4.9 | 3.2 | 5.4 |
| Leucine | 5.8 | 8.5 | 4.4 | 5.8 |
| Isoleucine | 3.0 | 4.4 | 2.8 | 3.0 |
| Methionine | 3.5 | 2.5 | 4.4 | 3.5 |
| Lysine | 7.6 | 4.8 | 3.2 | 7.6 |
| Threonine | 4.5 | 2.7 | 2.0 | 4.5 |

[1] Calculated to 11.2 g. of nitrogen.
[2] Minimum daily requirement for man, as established by Rose et al. (J. Biol. Chem., 217 (1955), 987–995). Basis: trytophan=1.0.
[3] Hydrolyzate supplemented with 1.0% tryptophan.

It will be observed that the product is satisfactory in essential amino acid content except for deficiencies in tryptophan and phenylalanine, the former being wholly destroyed and the latter partly destroyed during the complete hydrolysis of protein. These losses are accordingly made up from other sources when a nutritionally complete product is desired. The sodium content, which must be maintained at a low level in certain types of health disorders, is sufficiently low for use in practically all cases which would ordinarily require protein hydrolyzates. The over-all ash content falls within the allowable limits for food-grade hydrolyzates both from a health and taste standpoint. The product comprises essentially the individual amino acids, which are thus available in an easily assimilable form. Moreover, the product is largely free from the peptide linkages which were responsible in part for the bitter taste of the prior-art protein hydrolyzates.

EXAMPLE 2

When the addition of lime to the hydrolyzate was carried only to pH 7.0 in a series of tests otherwise closely paralleling Example 1, the sulfate content was reduced only to the range of 8–12%.

When the lime was added to pH 11.5–12, the sulfate content was lowered to around 2.6%.

When the limed mixture at pH 11.5–12 was filtered at 60° C., the sulfate was lowered to 0.2%.

EXAMPLE 3

The use of an optimum proportion of sodium hydroxide in our process is highly desirable to facilitate removal of calcium and ammonia and to leave an optimum proportion of sodium in the completed product. The removal of ammonia is especially important, since it tends to impart a bitter taste to the finished product. To determine the most desirable sodium level, a series of tests were conducted according to the procedure of Example 1 in which the quantity of sodium hydroxide employed was adjusted to yield a finished product containing 0, 2, 4, and 6% by weight of sodium, dry basis. The product which contained 4% sodium was found to be most desirable from an over-all standpoint of taste and sodium tolerance.

EXAMPLE 4

Another series of tests were carried out according to the same procedure to determine the best method for removing the residual calcium. Ammonium carbonate, carbon dioxide, sodium bisulfite, sodium bicarbonate, and sodium hydroxide, individually and in various combinations, were investigated as precipitating agents for removing calcium. Ammonium carbonate proved to be greatly superior for this purpose. The ammonium ion produced a high pH, which is necessary for maintaining the solubility of the calcium carbonate at a low level. In addition, the ammonia was easily removed at the high pH by vacuum distillation just before the hydrolyzate was adjusted with hydrochloric acid to pH 5.5.

Our invention is suitable for preparing improved amino acid mixtures from proteinaceous substances in general, including casein, wheat gluten, corn gluten, meat, fish scraps, and the like.

Our product is useful in a variety of pharmaceutical and medicinal applications; viz., in malnutrition and acute starvation, convalescence, pregnancy and lactation, allergies, hemorrhage and wound, burns, presurgery, surgery of the gastrointestinal tract, ulcers, diseases of the liver, pancreas, and the kidneys, and many others. In addition, our product is useful as a food seasoning agent owing to its glutamate content, particularly in sauces, soups, gravies, vegetables, meat, poultry, and fish.

While we have described our invention with reference to certain specific starting materials, manipulative techniques, and processing steps and conditions, it is to be understood that such matters are illustrative only and are not intended by way of limitation. Numerous modifications and equivalents of the invention will be apparent from the foregoing description to those skilled in the art.

In accordance with the foregoing description, we claim as our invention:

1. A process for preparing a protein hydrolyzate of improved flavor, which comprises subjecting a protein to hydrolysis with sulfuric acid, commingling the hydrolyzate with lime to a pH above about 10, adding alkali-metal hydroxide thereto in a proportion at least equivalent to but no more than about 10% in excess of the glutamic acid and aspartic acid contained therein, filtering calcium sulfate therefrom, adding ammonium carbonate to the liquid phase until the precipitation of calcium therefrom ceases, separating the resulting precipitate of calcium carbonate, stripping ammonia from the liquid phase, adjusting the pH of the liquid phase to between about 5 and about 6 with hydrochloric acid, and decolorizing the adjusted liquid phase by treatment with activated carbon at elevated temperature.

2. The process of claim 1 wherein said protein is casein.

3. The process of claim 1 wherein said protein is wheat gluten.

4. The process of claim 1 wherein said protein is corn gluten.

5. The process of claim 1 wherein the decolorized liquid phase is concentrated and dried to a solid under reduced pressure at a temperature below about 85° C.

6. A process for preparing a protein hydrolyzate of improved flavor, which comprises subjecting a protein to hydrolysis with sulfuric acid, commingling the hydrolyzate with lime to a pH between about 10 and about 12.5, adding sodium hydroxide thereto in a proportion at least equivalent to but no more than about 10% in excess of the glutamic acid and aspartic acid contained therein, filtering calcium sulfate therefrom at an elevated temperature around 60° C., adding ammonium carbonate to the liquid phase until the precipitation of calcium therefrom ceases, separating the resulting precipitate of calcium carbonate, stripping ammonia from the liquid phase, adjusting the pH of the liquid phase to around 5.5 with hydrochloric acid, and decolorizing the adjusted liquid phase by treatment with activated carbon at elevated temperature.

7. A process for preparing a protein hydrolyzate of improved flavor, which comprises subjecting a protein to hydrolysis with sulfuric acid, commingling the hydrolyzate with an aqueous lime slurry to a pH between about 11.5 and about 12, adding sodium hydroxide thereto in a proportion at least equivalent to but no more than about 10% in excess of the glutamic acid and aspartic acid contained therein, filtering calcium sulfate therefrom at an elevated temperature around 60° C., adding ammonium carbonate to the liquid phase until the precipitation of calcium therefrom ceases, separating the resulting precipitate of calcium carbonate, stripping ammonia from the liquid phase, adjusting the pH of the liquid phase to around 5.5 with hydrochloric acid, and decolorizing the adjusted liquid phase by treatment with activated carbon at elevated temperature.

8. A process as in claim 7 wherein the calcium sulfate filter cake is washed with water, and the wash water is slurried with lime and employed for liming additional hydrolyzate.

9. A process as in claim 7 wherein the quantity of sodium hydroxide is adjusted to yield a finished product containing about 4% by weight of sodium, dry basis.

References Cited in the file of this patent

UNITED STATES PATENTS

| | | |
|---|---|---|
| 2,414,299 | Hall | Jan. 14, 1947 |
| 2,533,114 | Hoglan | Dec. 5, 1950 |
| 2,647,142 | Hoglan | July 28, 1953 |
| 2,723,291 | Jones | Nov. 8, 1955 |